United States Patent
Akiyama et al.

(10) Patent No.: US 12,085,757 B2
(45) Date of Patent: Sep. 10, 2024

(54) OPTICAL FIBER FUSION SPLICING DEVICE, AND FUSION SPLICING METHOD FOR OPTICAL FIBER

(71) Applicant: SUMITOMO ELECTRIC OPTIFRONTIER CO., LTD., Yokohama (JP)

(72) Inventors: Hiroki Akiyama, Yokohama (JP); Hideaki Yusa, Yokohama (JP); Ryosuke Meo, Yokohama (JP); Hiroshi Takayanagi, Yokohama (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 0 days.

(21) Appl. No.: 17/608,026

(22) PCT Filed: Jun. 5, 2020

(86) PCT No.: PCT/JP2020/022271
§ 371 (c)(1),
(2) Date: Nov. 1, 2021

(87) PCT Pub. No.: WO2020/246576
PCT Pub. Date: Dec. 10, 2020

(65) Prior Publication Data
US 2022/0317376 A1    Oct. 6, 2022

(30) Foreign Application Priority Data
Jun. 5, 2019   (JP) ................. 2019-105103

(51) Int. Cl.
*G02B 6/255*    (2006.01)
(52) U.S. Cl.
CPC ......... *G02B 6/2553* (2013.01); *G02B 6/2551* (2013.01); *G02B 6/2552* (2013.01)

(58) Field of Classification Search
CPC .................... G02B 6/2551; G02B 6/2553
See application file for complete search history.

(56) References Cited

U.S. PATENT DOCUMENTS

| 6,370,919 B1 | 4/2002 | Kossat et al. |
| 6,610,965 B1 | 8/2003 | Tanabe |
| (Continued) | | |

FOREIGN PATENT DOCUMENTS

| EP | 0186819 A1 * | 9/1986 | ........... G02B 6/2551 |
| EP | 0 831 347 A2 | 3/1998 | |
| | (Continued) | | |

OTHER PUBLICATIONS

Sep. 1, 2020 International Search Report issued in International Patent Application No. PCT/JP2020/022271.

*Primary Examiner* — Omar R Rojas
(74) *Attorney, Agent, or Firm* — Oliff PLC

(57) ABSTRACT

A device for fusion splicing, by an arc discharge, a pair or a plurality of pairs of optical fibers arranged so that end surfaces thereof face each other. An optical fiber arrangement portion positions the pair or the plurality of pairs of optical fibers between a pair of electrodes. A control portion controls a voltage applied to the pair of electrodes. The control portion generates a first discharge between the pair of electrodes, stops the first discharge between the pair of electrodes, and then generates an arc discharge between the pair of electrodes to fusion-splice the pair or the plurality of pairs of optical fibers to each other. A discharge time of the first discharge is 200 milliseconds or less. A time from stopping the first discharge to starting the arc discharge is 100 milliseconds or less.

3 Claims, 12 Drawing Sheets

(56) References Cited

U.S. PATENT DOCUMENTS

2001/0047668 A1* 12/2001 Ochiai ................ G02B 6/2551
                                                             65/407
2005/0041939 A1    2/2005  Saito et al.

FOREIGN PATENT DOCUMENTS

| EP | 0853246 A2 | 7/1998 |
| --- | --- | --- |
| JP | S62-099704 A | 5/1987 |
| JP | S62-184403 A | 8/1987 |
| JP | H05-142442 A | 6/1993 |
| JP | H07-318742 A | 12/1995 |
| JP | 2000-098170 A | 4/2000 |
| JP | 2001-502814 A | 2/2001 |
| JP | 2001-066456 A | 3/2001 |
| JP | 2003-149485 A | 5/2003 |
| JP | 2004-138650 A | 5/2004 |
| JP | 2004-184448 A | 7/2004 |
| JP | 2005-031439 A | 2/2005 |
| JP | 2009-122508 A | 6/2009 |

* cited by examiner

OPTICAL FIBER FUSION SPLICING DEVICE, AND FUSION SPLICING METHOD FOR OPTICAL FIBER

TECHNICAL FIELD

The present disclosure relates to an optical fiber fusion splicer and a fusion splicing method for optical fibers. The present application claims the benefit of the priority based on Japanese Patent Application No. 2019-105103, filed on Jun. 5, 2019, the entire contents described in the application is incorporated herein by reference.

BACKGROUND ART

Patent Literature 1 to 5 describes techniques relating to an optical fiber fusion splicer or a fusion splicing method for optical fibers.

CITATION LIST

Patent Literature

[Patent Literature 1] Japanese Unexamined Patent Publication No. 2009-122508
[Patent Literature 2] Japanese Unexamined Patent Publication No. 2004-138650
[Patent Literature 3] Japanese Unexamined Patent Publication No. 2001-66456
[Patent Literature 4] Japanese Unexamined Patent Publication No. 2000-98170
[Patent Literature 5] Japanese Unexamined Patent Publication No. H7-318742

SUMMARY OF INVENTION

An optical fiber fusion splicer according to the present disclosure is a device for fusion splicing, by an arc discharge, a pair or a plurality of pairs of optical fibers arranged so that end surfaces thereof face each other. This device includes a pair of electrodes, an optical fiber arrangement portion, and a control portion. The pair of electrodes generates the arc discharge. The optical fiber arrangement portion positions the pair or the plurality of pairs of optical fibers between the pair of electrodes. The control portion controls a voltage applied to the pair of electrodes. The control portion generates a first discharge between the pair of electrodes, stops the first discharge between the pair of electrodes, and then generates an arc discharge between the pair of electrodes to fusion-splice the pair or the plurality of pairs of optical fibers to each other. A discharge time of the first discharge is 200 milliseconds or less. A time from stopping the first discharge to starting the arc discharge is 100 milliseconds or less.

A fusion splicing method for optical fibers according to the present disclosure is a method for fusion splicing, by an arc discharge generated between the pair of electrodes, a pair or a plurality of pairs of optical fibers arranged so that end surfaces thereof face each other between a pair of electrodes. This method includes a first step, a second step, and a third step. In the first step, a discharge is generated between the pair of electrodes. In the second step, the discharge between the pair of electrodes stops. In the third step, the arc discharge is generated between the pair of electrodes, and the pair or the plurality of pairs of optical fibers are fused and spliced to each other. A discharge time of the first step is 200 milliseconds or less. A time from stopping the discharge of the first step to starting the arc discharge of the third step is 100 milliseconds or less.

DESCRIPTION OF EMBODIMENTS

Figure 1:
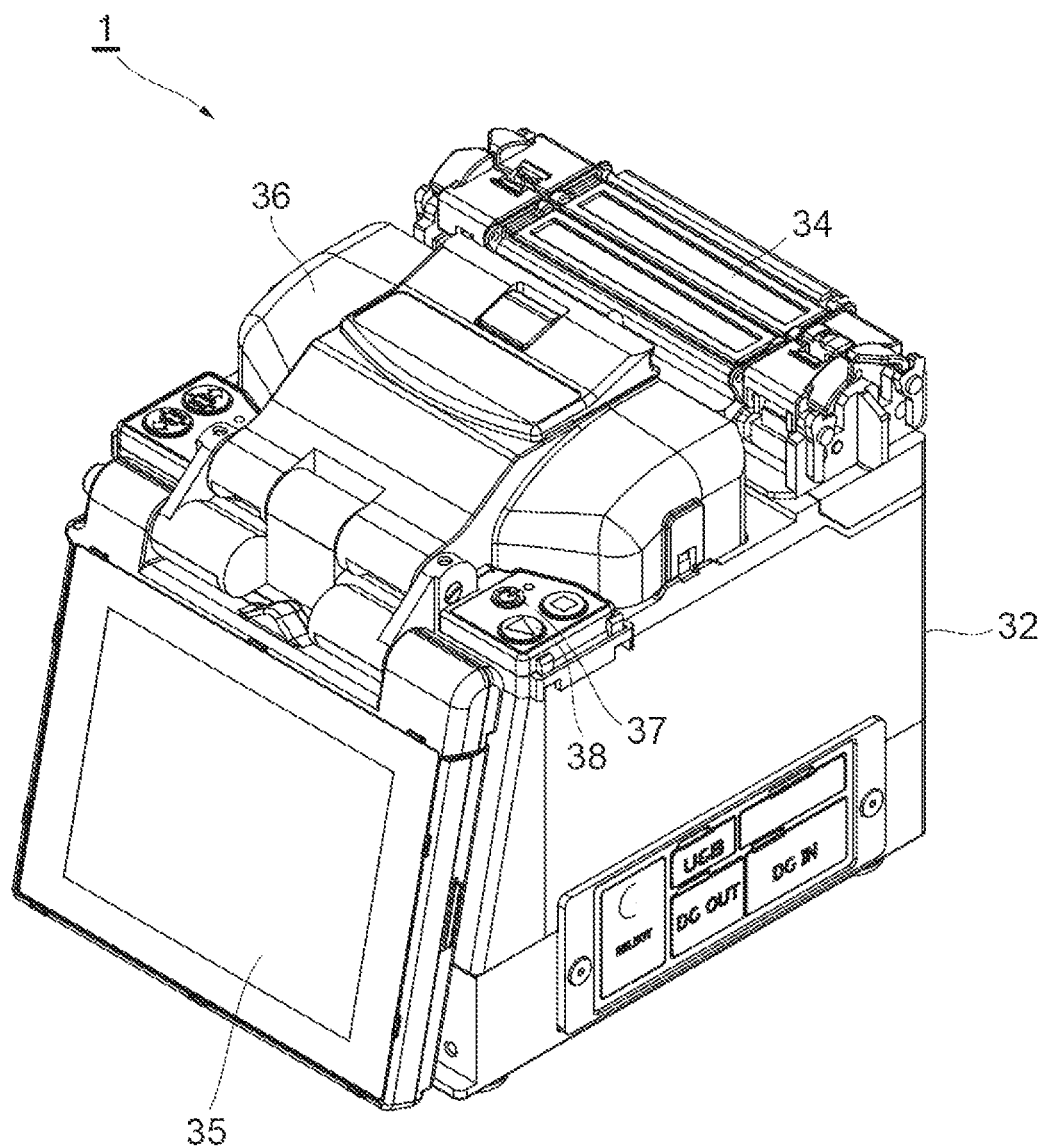
FIG. 1 is a perspective view showing an exterior of a fusion splicer according to an embodiment.

Problems to be Solved by the Present Disclosure

As disclosed in Patent Literature 1 to 5, a method and a device for fusion splicing, by an arc discharge between a pair of electrodes, a pair or a plurality of pairs of optical fibers arranged so that end surfaces thereof face each other are known. In such a fusion splicing method and device, when an arc discharge occurs, a discharge path with the smallest insulation resistance between the pair of electrodes is selected. Normally, the discharge path is coincident with the shortest path between the pair of electrodes, but a particular path which is not coincident with the shortest path and is not constant may be selected according to electrical conditions between the electrodes, for example, ion distribution conditions. Therefore, when the discharge path varies, it becomes difficult to perform fusion splicing with a stable quality.

Therefore, an object of the present disclosure is to provide an optical fiber fusion splicer and a fusion splicing method for optical fibers capable of reducing variation in a discharge path and stabilizing the quality of fusion-spliced portions.

Effect of the Present Disclosure

According to the present disclosure, it is possible to provide an optical fiber fusion splicer and a fusion splicing method for optical fibers capable of reducing a variation in a discharge path and stabilizing the quality of fusion-spliced portions.

Description of Embodiments of the Present Disclosure

First, an embodiment of the present disclosure will be listed and described. A optical fiber fusion splicer according to one embodiment is a device for fusion splicing, by an arc discharge, a pair or a plurality of pairs of optical fibers arranged so that end surfaces thereof face each other. This fusion splicer includes a pair of electrodes, an optical fiber arrangement portion, and a control portion. The pair of electrodes generate an arc discharge. The optical fiber arrangement portion positions a pair or a plurality of pairs of optical fibers between the pair of electrodes. The control portion controls a voltage applied to the pair of electrodes. The control portion generates a first discharge between the pair of electrodes, stops the first discharge between the pair of electrodes, and then generates an arc discharge between the pair of electrodes to fusion-splice the pair or the plurality of pairs of optical fibers to each other. A discharge time of the first discharge is 200 milliseconds or less. A time from stopping the first discharge to starting the arc discharge is 100 milliseconds or less.

A fusion splicing method for optical fibers according to the embodiment is a method for fusion splicing, by an arc discharge generated between the pair of electrodes, a pair or a plurality of pairs of optical fibers arranged so that end surfaces thereof face each other between a pair of electrodes. This method includes a first step, a second step, and a third step. In the first step, a discharge is generated between the pair of electrodes. In the second step, the discharge between the pair of electrodes stops. In the third step, the arc discharge is generated between the pair of electrodes, and the pair or the plurality of pairs of optical fibers are fused and spliced to each other. The discharge time in the first step is 200 milliseconds or less. The time from stopping the discharge in the first step to starting the arc discharge in the third step is 100 milliseconds or less.

The present inventor has found through experiments that a variation in the discharge path can be reduced and the quality of fusion-spliced portions can be stabilized by performing an extremely short-time discharge, that is, 200 milliseconds or less, before the arc discharge for fusion splicing, and then performing the arc discharge after stopping for a short period of time, that is, 100 milliseconds or less. There are various possible causes for this, but one way of thinking is as follows, for example. When an ion distribution between the pair of electrodes changes for some reason and becomes non-uniform, a peculiar path is selected during the arc discharge. In such a case, when an extremely short-time discharge is performed before the arc discharge, the ion distribution between the electrodes can be made uniform by the discharge. Therefore, it is possible to improve a probability that a normal path, for example, the shortest path between the pair of electrodes is selected as a discharge path, and to reduce the variation in the discharge path.

In the above-described fusion splicer, a power of the first discharge may be greater than a power of the arc discharge. Similarly, in the above-described fusion splicing method, a power of the discharge in the first step may be greater than a power of the arc discharge in the third step. According to an experiment of the present inventor, for example, in such a case, the variation in the discharge path can be effectively reduced, and the quality of the fusion-spliced portions can be further stabilized.

In the above-described fusion splicer, the control portion may generate the arc discharge after the first discharge and the stopping are alternately repeated a plurality of times. Similarly, in the above-described fusion splicing method, the first step and the second step may be alternately repeated a plurality of times, and then the third step may be performed. For example, also in such a case, the above effects can be achieved.

In the above-described fusion splicer, the power of each of the first discharges may be equal to or less than a power of the arc discharge. Similarly, in the above-described fusion splicing method, the power of the discharge in each of the first steps may be set to be equal to or less than a power of the arc discharge in the third step. According to the experiment of the present inventor, for example, in such a case, the variation in the discharge path can be effectively reduced, and the quality of the fusion-spliced portions can be further stabilized.

In the above-described fusion splicer, the control portion may perform a sputter discharge for cleaning the end surfaces before the first discharge, and a time from stopping the sputter discharge to starting the first discharge may be longer than 100 milliseconds. Similarly, the above-described fusion splicing method may further include a step of performing the sputter discharge for cleaning the end surfaces before the first step, and the time from stopping the sputter discharge to starting the discharge in the first step may be longer than 100 milliseconds. Conventionally, when optical fibers are fusion-spliced, the sputter discharge may be performed for cleaning the end surfaces in advance. Generally, a discharge time of the sputter discharge is in a range of 50 milliseconds to 200 milliseconds. The first discharge and the discharge in the first step of the present disclosure have completely different purposes from those of the sputter discharge, and exert the above-described effects due to a stopping time of 100 milliseconds or less which is shorter than the sputter discharge.

In the described-above fusion splicer, a discharge time of the first discharge may be 100 milliseconds or less. Similarly, in the above-described fusion splicing method, a discharge time in the first step may be 100 milliseconds or less. In this case, the variation in the discharge path can be effectively reduced.

Details of Embodiments of the Present Disclosure

An optical fiber fusion splicer and the fusion splicing method for optical fibers according to embodiments of the present disclosure will be described below with reference to the drawings. The present invention is not limited to these examples, and is indicated by the claims, and it is intended to include all changes within meaning and a range equivalent to the claims. In the following description, the same elements are denoted by the same reference numerals in the description of drawings, and the repeated description thereof will be omitted. In the description, an XYZ Cartesian coordinate system shown in the drawings may be referred to.

FIG. 1 is a perspective view showing an exterior of a fusion splicer 1 according to the present embodiment. The fusion splicer 1 is a device in which a plurality of pairs of optical fibers arranged so that end surfaces thereof face each other are melted by an arc discharge and fusion-spliced to each other. The optical fiber is, for example, glass fiber. The fusion splicer 1, for example, fusion-splices each of end portions of a plurality of optical fibers constituting a multi-fiber optical cable and each of end portions of a plurality of optical fibers constituting another multi-fiber optical cable.

As shown in FIG. 1, the fusion splicer 1 includes a box-shaped housing 32. A fusion splicing portion, which will be described later, for fusing the optical fibers to each other and a heater 34 are provided on an upper part of the housing 32. The heater 34 heats and contracts a fiber reinforcing sleeve which covers a fused portion of the optical fiber. The fusion splicer 1 further includes a monitor 35, a windshield cover 36, a power switch 37, and a splicing start switch 38. The monitor 35 displays a fusion splicing status of the optical fibers captured by a camera (not shown) disposed inside the housing 32. The windshield cover 36 prevents wind from entering the fusion splicing portion. The power switch 37 is a push button for switching power of the fusion splicer 1 on/off according to an operation of a user. The splicing start switch 38 is a push button for starting an operation for fusing the optical fibers to each other according to an operation of the user.

Figure 2:
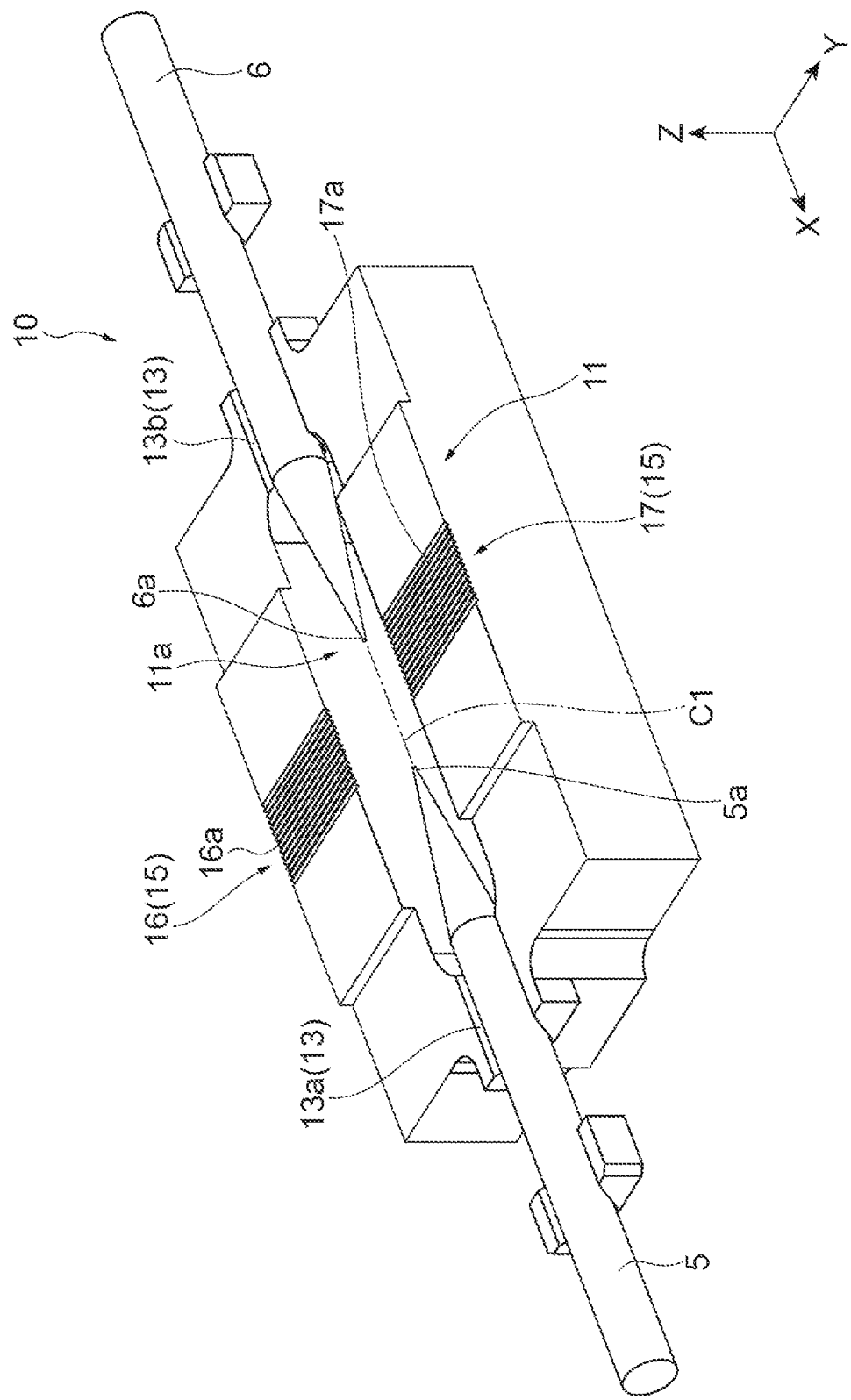
FIG. 2 is an enlarged perspective view showing a fusion splicing portion included in the fusion splicer.

FIG. 2 is an enlarged perspective view showing the fusion splicing portion 10 included in the fusion splicer 1. As shown in FIG. 2, the fusion splicing portion 10 has a pair of electrodes 5 and 6 and a pedestal 11. The pair of electrodes 5 and 6 are disposed apart from each other on the pedestal 11. A tip end 5a of the electrode 5 and a tip end 6a of the electrode 6 face each other. In the shown example, each of the electrodes 5 and 6 includes a substantially conical portion of which a diameter decreases toward the tip ends 5a and 6a.

The pedestal 11 includes an electrode arrangement portion 13 and an optical fiber arrangement portion 15. As an example, a material of the pedestal 11 may be zirconia. The electrode arrangement portion 13 is a portion in which the pair of electrodes 5 and 6 are disposed. The electrode arrangement portion 13 has contact surfaces 13a and 13b corresponding to the pair of electrodes 5 and 6, respectively. The contact surfaces 13a and 13b are formed so that cross sections thereof have a substantially V shape due to two planes. A position of the electrode 5 in a Y direction and a Z direction is determined by the electrode 5 being in contact with the contact surface 13a. A position of the electrode 6 in the Y direction and the Z direction is determined by the electrode 6 being in contact with the contact surface 13b. The positions of the electrodes 5 and 6 in the X direction can be adjusted with the electrodes 5 and 6 in contact with the contact surfaces 13a and 13b. The positioned electrodes 5 and 6 can be fixed to the electrode arrangement portion 13 by a fixing member (not shown). Further, the pedestal 11 has an opening portion 11a. The opening portion 11a passes through the pedestal 11 in the Z direction in a region between the contact surface 13a and the contact surface 13b in the X direction. The tip ends 5a and 6a of the pair of electrodes 5 and 6 face each other in the opening portion 11a.

The optical fiber arrangement portion 15 is located between the pair of electrodes 5 and 6 in the X direction. The optical fiber arrangement portion 15 has a first arrangement portion 16 and a second arrangement portion 17. In the Y direction, the first arrangement portion 16 is located on one side of a center line C1 connecting the tip ends 5a and 6a of the pair of electrodes 5 and 6. The second arrangement portion 17 is located on the other side of the center line C1. That is, the first arrangement portion 16 and the second arrangement portion 17 are separated from each other with the center line C1 interposed therebetween in the Y direction. The first arrangement portion 16 has a plurality of grooves 16a each of which accommodates and positions each of the plurality of optical fibers on one side. The number of optical fibers on one side is 12 in the shown example. A shape of a cross section of the groove 16a perpendicular to an extending direction thereof is, for example, a V shape. The grooves 16a are disposed at equal intervals in the X direction and extend linearly in the Y direction. Similarly, the second arrangement portion 17 has a plurality of grooves 17a each of which accommodates and positions each of the plurality of optical fibers on the other side. The number of the optical fibers on the other side is also 12 in the shown example. A shape of a cross section of the groove 17a perpendicular to an extending direction thereof is, for example, a V shape. The grooves 17a are disposed at equal intervals in the X direction and extend linearly in the Y direction. Each of the plurality of grooves 16a of the first arrangement portion 16 and each of the plurality of grooves 17a of the second arrangement portion 17 are located on a common straight line. Thus, the optical fibers positioned by the grooves 16a of the first arrangement portion 16 face the optical fibers positioned by the grooves 17a of the second arrangement portion 17 in a region between the first arrangement portion 16 and the second arrangement portion 17. The region between the first arrangement portion 16 and the second arrangement portion 17 is the opening portion 11a of the pedestal 11.

Figure 3:
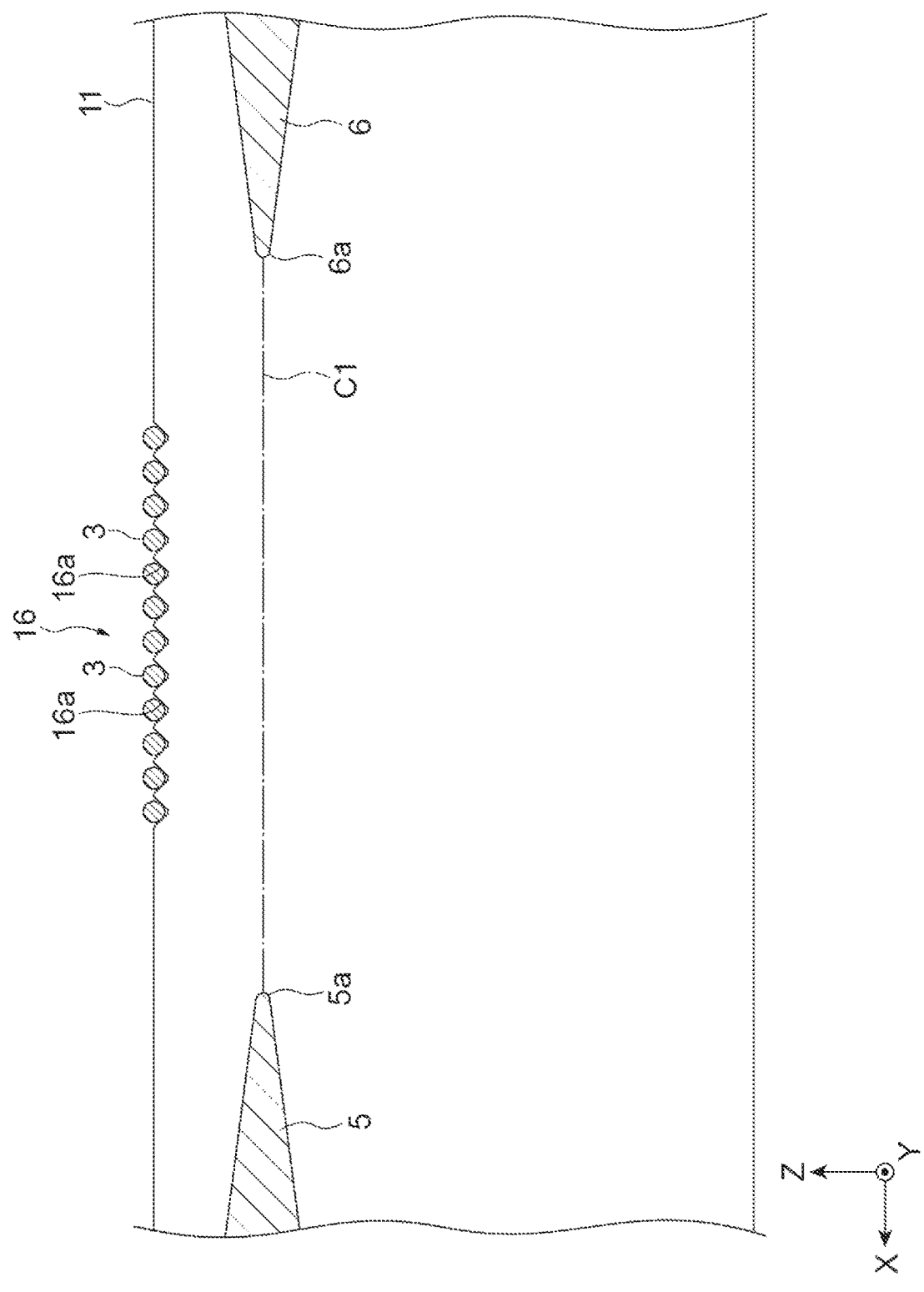
FIG. 3 is an enlarged side cross-sectional view showing a pair of electrodes and a first arrangement portion of a pedestal.

FIG. 3 is an enlarged side cross-sectional view showing the pair of electrodes 5 and 6 and the first arrangement portion 16 of the pedestal 11. FIG. 3 is a cross-sectional view of the first arrangement portion 16 side along an XZ plane including the center line C1, and also shows the plurality of optical fibers 3 provided on the first arrangement portion 16. Since a configuration in which a plurality of optical fibers are installed in the second arrangement portion 17 is the same as a configuration in which the plurality of optical fibers 3 are installed in the first arrangement portion 16, description thereof will be omitted.

As shown in FIG. 3, the plurality of optical fibers 3 are located between the pair of electrodes 5 and 6 in the direction X, and are accommodated in the corresponding grooves 16a. An axial direction of each of the optical fibers 3 coincides with the Y direction. The plurality of optical fibers 3 are disposed apart from each other in the X direction. A pitch between the adjacent optical fibers 3 is uniform. As an example, a diameter of each of the optical fibers 3 is 125 µm, and the plurality of optical fibers 3 are arranged in the X direction with a pitch of 250 µm corresponding to twice the diameter. A position at which the optical fibers 3 are arranged is deviated from the center line C1 of the electrodes 5 and 6 in the Z direction.

Figure 4:
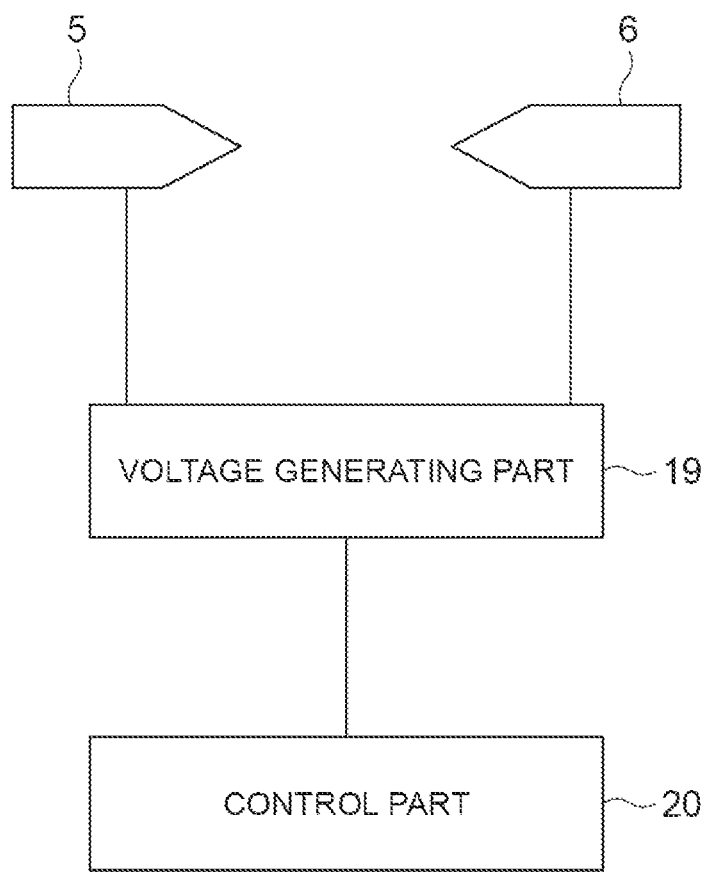
FIG. 4 is a block diagram showing an electrical connection inside the fusion splicer.

FIG. 4 is a block diagram showing an electrical connection inside the fusion splicer 1. As shown in FIG. 4, the fusion splicer 1 further includes a voltage generating portion 19 which applies a voltage to the pair of electrodes 5 and 6, and a control portion 20 which controls the voltage output from the voltage generating portion 19. The voltage generating portion 19 is electrically connected to the electrodes 5 and 6 via a wiring inside the fusion splicer 1, and applies a voltage for discharging to the electrodes 5 and 6. The control portion 20 is electrically connected to the voltage generating portion 19 and controls a magnitude and application timing of the voltage.

Figure 5:
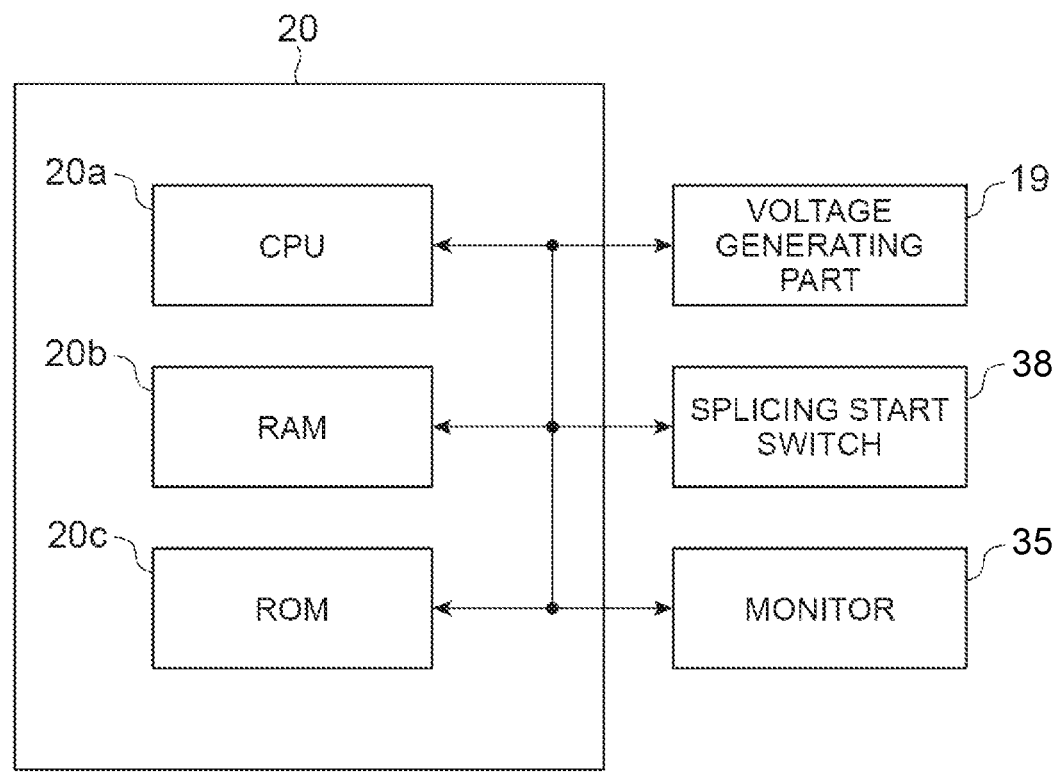
FIG. 5 is a block diagram showing a hardware configuration example of a control portion.

FIG. 5 is a block diagram showing a hardware configuration example of the control portion 20. As shown in FIG. 5, the control portion 20 may be configured as a computer including a central processing unit (CPU) 20a, a random access memory (RAM) 20b, and a read only memory (ROM) 20c. The control portion 20 reads and writes data from/to the RANI 20b and the ROM 20c under the control of the CPU 20a while reading and executing a program stored in the ROM 20c in advance. Thus, the control portion 20 can realize each function of the fusion splicing portion 10 including facing the optical fibers 3 and discharging the electrodes 5 and 6. An operation status of the control portion 20 is always displayed on the monitor 35 during the operation of the fusion splicer 1. The control portion 20 is electrically connected to the splicing start switch 38 and receives an electric signal from the splicing start switch 38.

Figure 6:
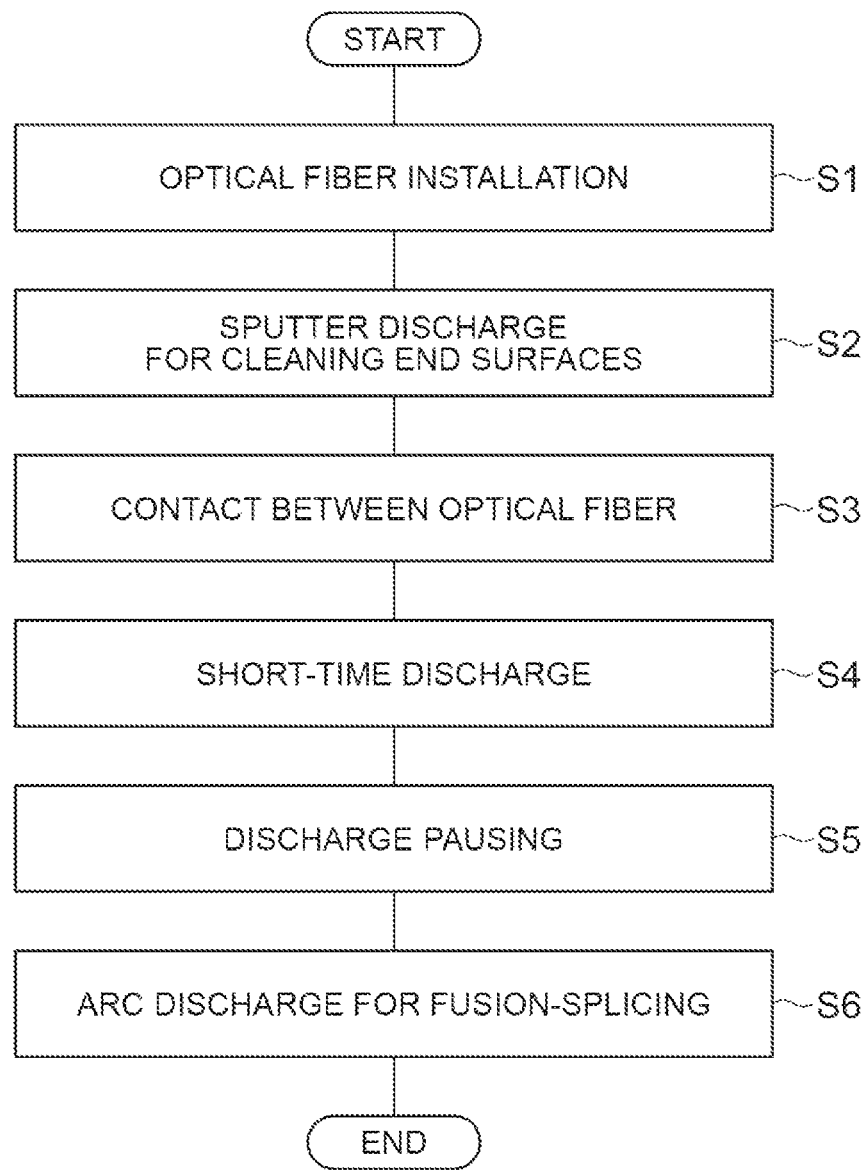
FIG. 6 is a flowchart showing an operation of the fusion splicer and a fusion splicing method of an embodiment.

Here, the operation of the fusion splicer 1 will be described together with a fusion splicing method of the present embodiment. FIG. 6 is a flowchart showing the operation of the fusion splicer 1 and the fusion splicing method of the present embodiment. FIGS. 7 to 10 are schematic views showing a state of the discharge between the electrodes 5 and 6.

As shown in FIG. 6, as Step S1, the optical fibers 3 on one side which will be spliced are accommodated in each of the grooves 16a of the pedestal 11 of the fusion splicer 1. The optical fibers 3 on the other side which will be spliced are accommodated in each of the grooves 17a of the pedestal 11. Next, an end surface of the optical fiber 3 accommodated in the groove 16a and an end surface of the optical fiber 3 accommodated in the groove 17a are made to face each other at the opening part 11a.

Figure 7:
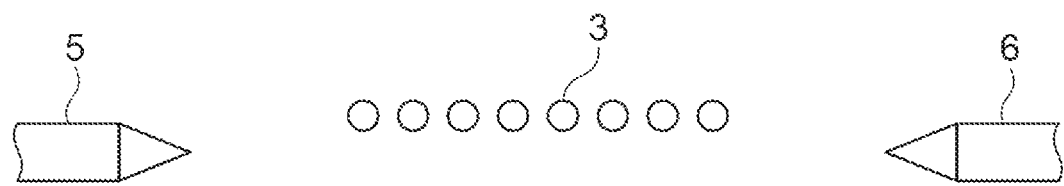
FIG. 7 is a schematic view showing a state in which a discharge between electrodes stops.

Next, as Step S2, a sputter discharge for cleaning the end surfaces is performed by applying a predetermined voltage between the electrodes 5 and 6 from the voltage generating portion 19. A discharge time of the sputter discharge is longer than 50 milliseconds and shorter than 200 milliseconds. In one example, the discharge time of the sputter discharge is 100 milliseconds. The power of the discharge applied between the electrodes 5 and 6 during the sputter discharge is, for example, in a range of 50% to 200% of the power of the arc discharge at the time of fusion splicing which will be described later. After the sputter discharge, the voltage applied between the electrodes 5 and 6 from the voltage generating portion 19 is lowered, and the discharge stops until Step S4. During that time, an operator can check through the monitor 35 whether or not dust or the like is attached to the end surfaces of the optical fibers. This stopping period is longer than 100 milliseconds, typically on the order of one to several seconds. FIG. 7 shows the stopping period.

As Step S3, the end surface of the optical fiber 3 accommodated in the groove 16a and the end surface of the optical fiber 3 accommodated in the groove 17a face each other at the opening portion 11a. This facing is performed by portions holding the optical fibers 3 being made to approach each other in the Y direction under control of the control portion 20.

Figure 8:
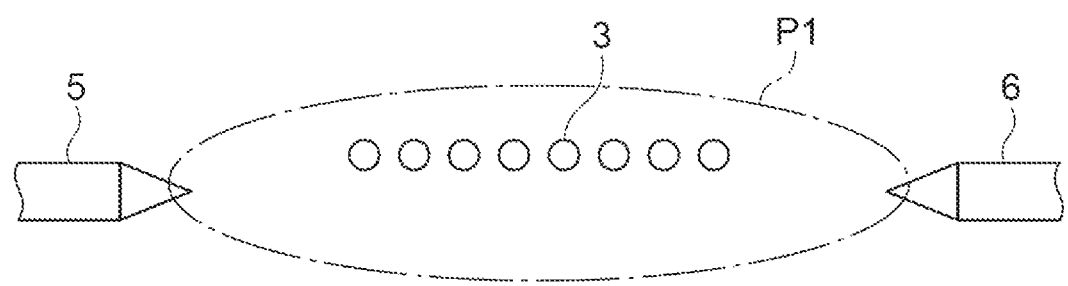
FIG. 8 is a schematic view showing a state of the discharge between the electrodes.

Subsequently, as Step S4, a voltage is instantaneously applied between the electrodes 5 and 6 from the voltage generating portion 19, and an extremely short-time discharge P1 shown in FIG. 8 is generated between the electrodes 5 and 6. Step S4 is a first step in the present embodiment, and this discharge is a first discharge in the present embodiment. Specifically, for example, a voltage of several kV to several tens of kV is applied between the electrodes 5 and 6, and a high-frequency discharge is performed with a current having a frequency of about 100 kHz and several tens of mA. The discharge time may be 200 milliseconds or less, 100 milliseconds or less, 50 milliseconds or less, 30 milliseconds or less, or 10 milliseconds or less. Since the arc discharge time at the time of fusion splicing is 1 second or more, usually about several seconds to several tens of seconds, the discharge time in Step S3 is extremely short as compared with the arc discharge time at the time of the fusion splicing. The discharge time in Step S4 is equal to or shorter than the sputter discharge time in Step S2 described above.

The power of the discharge in Step S4 may be greater than the power of the arc discharge at the time of the fusion splicing, may be the same as the power of the arc discharge at the time of the fusion splicing, or may be smaller than the power of the arc discharge at the time of the fusion splicing. In one example, the power of the discharge in Step S4 may be 30% or less or 300% or more of the power of the arc discharge at the time of the fusion splicing.

Figure 9:
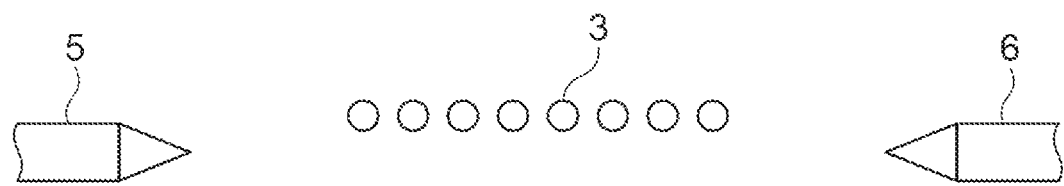
FIG. 9 is a schematic view showing the state in which the discharge between the electrodes stops.

Subsequently, as Step S5, as shown in FIG. 9, the discharge P1 between the electrodes 5 and 6 stops. Specifically, the voltage applied between the electrodes 5 and 6 from the voltage generating portion 19 is set to be equal to or lower than a voltage at which a discharge does not occur. A stopping time, that is, a time from the stopping of the discharge P1 to the start of the next arc discharge may be 100 milliseconds or less, 50 milliseconds or less, 30 milliseconds or less, or 10 milliseconds or less. Step S5 is a second step in the present embodiment.

Figure 10:
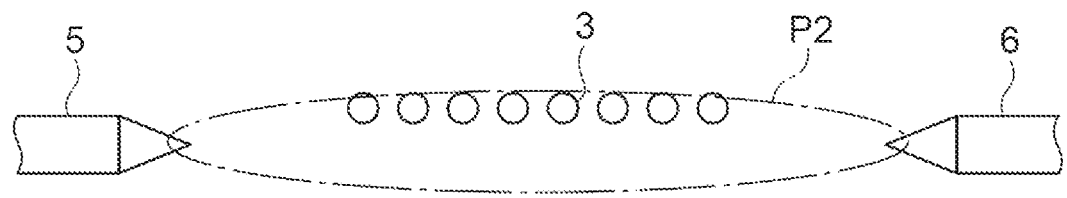
FIG. 10 is a schematic view showing the state of the discharge between the electrodes.

Then, as Step S6, the respective end portion of the optical fiber 3 on one side and the optical fiber 3 on the other side are melted, and fusion-spliced to each other by generating an arc discharge P2 shown in FIG. 10 between the electrodes 5 and 6, and superimposing the arc discharge P2 on a portion in which the end portions of the optical fibers 3 face each other. Specifically, for example, a voltage of several kV to several tens of kV is applied between the electrodes 5 and 6, and a high-frequency discharge is performed with a current having a frequency of about 100 kHz and several tens of mA. The discharge time of the arc discharge P2 is 1 second or more.

Figure 11:
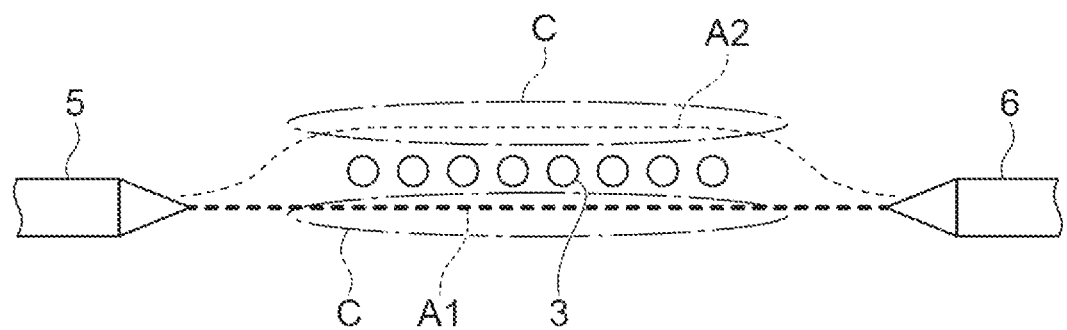
FIG. 11 is a diagram for explaining problems in a conventional device and method.

Effects obtained by the fusion splicer 1 and the fusion splicing method of the present embodiment having the above-described configuration will be described. FIG. 11 is a diagram for explaining problems in conventional devices and methods. When the arc discharge P2 for fusion splicing is generated, a discharge path having the smallest insulation resistance is selected between the electrodes 5 and 6. Normally, the discharge path coincides with the shortest path A1 between the electrodes 5 and 6, but a peculiar path which does not coincide with the shortest path and is not constant may be selected according to the electrical conditions between the electrodes 5 and 6, for example, a distribution condition of ions C which are discharge carriers. In the drawing, a path A2 is shown as an example of such a path. Thus, when the discharge path is not constant, it becomes difficult to perform the fusion splicing with stable quality.

The present inventor has found through experiments that a variation in the discharge path can be reduced and the quality of the fusion-spliced portions can be stabilized by performing an extremely short-time discharge P1 before the arc discharge P2 for the fusion splicing and then performing an arc discharge P2 after a short stopping. There are various possible causes for this, but one way of thinking is that when the extremely short-time discharge P1 is performed before the arc discharge P2, the distribution of ions C between the electrodes 5 and 6 can be uniform due to the discharge P1. Therefore, it is possible to improve the probability that a normal path, for example, the shortest path A1 between the electrodes 5 and 6 is selected as the discharge path, and to reduce the variation in the discharge path.

As described above, the power of the discharge P1 may be greater than the power of the arc discharge P2. According to the experiment of the present inventor, for example, in such a case, the variation of the discharge path can be effectively reduced, and the quality of the fusion-spliced portion can be further stabilized.

As in the present embodiment, the control portion 20 may perform the sputter discharge for cleaning the end surfaces before the discharge P1, and the time from stopping the sputter discharge to starting the discharge P1 may be longer than 100 milliseconds. Conventionally, when the fusion splicing of the optical fibers is performed, the sputter discharge for cleaning the end surfaces may be performed in advance. Generally, the discharge time of this sputter discharge is in a range of 50 milliseconds to 200 milliseconds. The discharge P1 of the present embodiment has a completely different purpose from that of such a sputter discharge, and exerts the above-described effects by setting the stopping time to 100 milliseconds or less which is shorter than that of the sputter discharge.

As described above, the discharge time of the discharge P1 may be 100 milliseconds or less. In this case, the variation in the discharge path can be effectively reduced.

Modified Example

Figure 12:
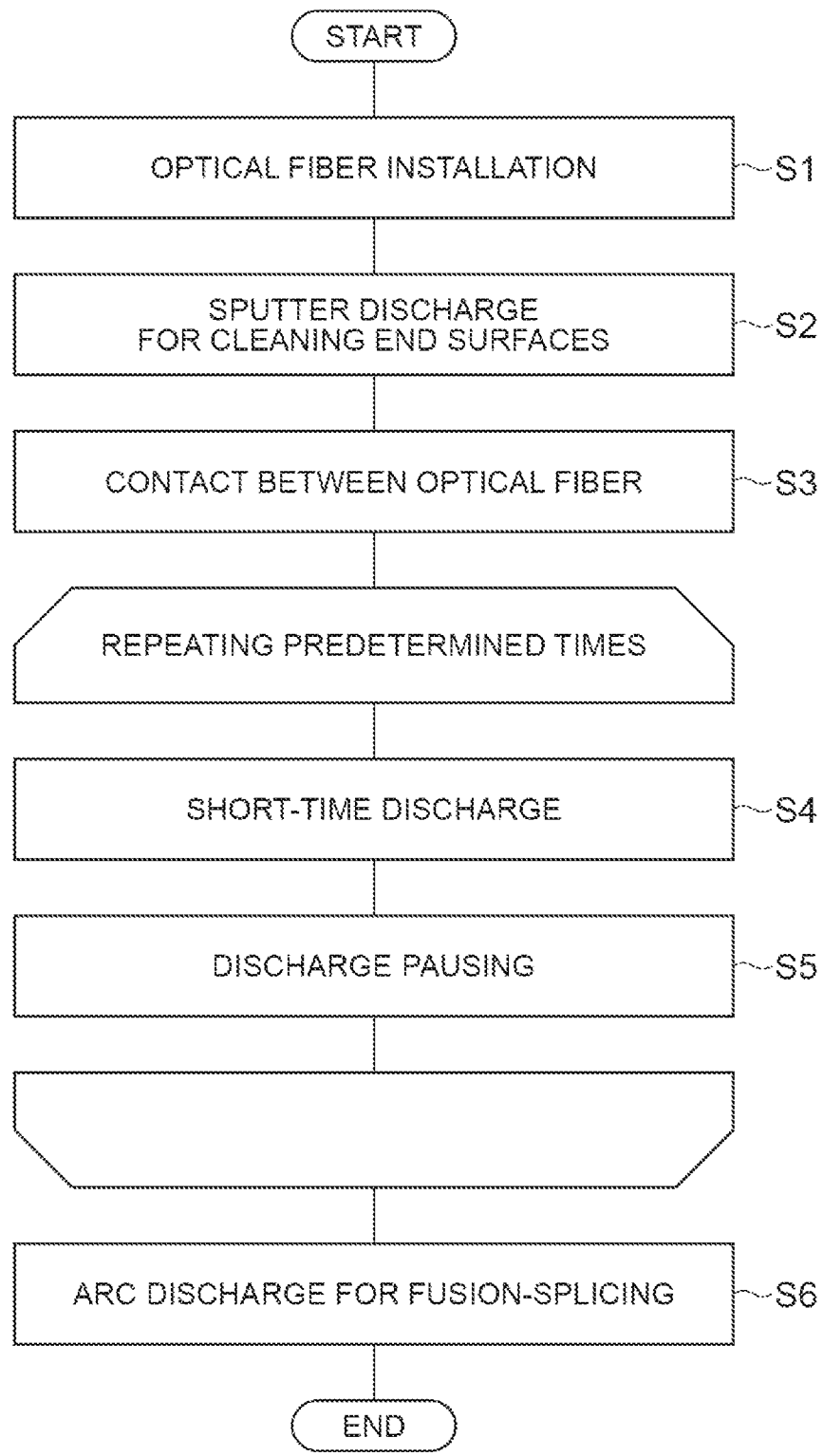
FIG. 12 is a flowchart showing the operation of the fusion splicer and the fusion splicing method according to one modification.

FIG. 12 is a flowchart showing the operation of the fusion splicer 1 and the fusion splicing method according to a modified example of the above-described embodiment. In the above-described embodiment, the short-time discharge P1 is performed only once, but in this modified example, the discharge P1 is performed a plurality of times. That is, after Step S4 and Step S5 of the above-described embodiment are alternately repeated a plurality of times, Step S6 is performed. Details of Steps S4 and S5 are the same as those in the above-described embodiment. The number of repetitions of Steps S4 and S5 may be two, three, or any number of four or more. Also in this modified example, the same effects as those of the above-described embodiment can be obtained.

In the present modified example, the power of the discharge in each Step S4 may be equal to or less than the power of the arc discharge in Step S6. According to the experiment of the present inventor, for example, in such a case, the variation of the discharge path can be effectively reduced, and the quality of the fusion-spliced portions can be further stabilized.

Example

The present inventor conducted an experiment with the discharge time of the discharge P1 being 10 milliseconds and the stopping time after the discharge P1 being several tens of milliseconds, while the power of the discharge and the number of discharges of the discharge P1 are changed, to confirm the effects of the fusion splicing method according to the above-described embodiment and the modified example. Then, a relative abnormal discharge occurrence rate was investigated when the abnormal discharge occurrence rate was 1.0 in a conventional method in which the arc discharge P2 was performed without performing the discharge P1 after the sputter discharge for cleaning.

As a result, when the number of discharges of the discharge P1 was one, and the discharge power of the discharge P1 was 300% of the discharge power of the arc discharge P2, the relative abnormal discharge occurrence rate was 0.5. When the number of discharges of the discharge P1 was two, and the discharge power of the discharge P1 was 100% of the discharge power of the arc discharge P2, the relative abnormal discharge occurrence rate was 0.6. When the number of discharges of the discharge P1 was three, and the discharge power of the discharge P1 was 30% of the discharge power of the arc discharge P2, the relative abnormal discharge occurrence rate was 0.9. As described above, it was confirmed that the variation of the discharge path can be effectively reduced by the above-described embodiment and modified example.

The optical fiber fusion splicer and the fusion splicing method for optical fibers according to the present invention are not limited to the above-described embodiments, and various other modifications are possible. For example, in the above-described embodiment and modified example, a plurality of pairs of optical fibers are collectively fusion-spliced, but a pair of optical fibers may be fusion-spliced. Even in that case, the variation in the discharge path can be reduced, and the quality of the fusion-spliced portions can be stabilized.

REFERENCE SIGNS LIST

1 Fusion splicer
3 Optical fiber
5, 6 Electrode
5a, 6a Tip end
10 Fusion splicing portion
11 Pedestal
11a Opening portion
13 Electrode arrangement portion
13a, 13b Contact surface
15 Optical fiber arrangement portion
16 First arrangement portion
16a Groove
17 Second arrangement portion
17a Groove
19 Voltage generating portion
20 Control portion
20a CPU
20b RAM
20c ROM
32 Housing
34 Heater
35 Monitor
36 Windshield cover
37 Power switch
38 Splicing start switch
C Ion
C1 Center line
P1 Discharge
P2 Arc discharge

The invention claimed is:

1. A fusion splicing method for optical fibers for fusion splicing, by an arc discharge generated between a pair of electrodes, a plurality of pairs of optical fibers arranged so that end surfaces thereof face each other between a pair of electrodes, the fusion splicing method comprising:
   a first step of generating a discharge between the pair of electrodes;
   a second step of stopping the discharge between the pair of electrodes; and
   a third step of generating the arc discharge between the pair of electrodes and fusing and splicing the plurality of pairs of optical fibers to each other, wherein
   a discharge time of the first step is greater than 0 milliseconds and less than or equal to 200 milliseconds, and
   a time from stopping the discharge of the first step to starting the arc discharge of the third step is greater than 0 milliseconds and less than or equal to 50 milliseconds,
   the discharge time of the first step is shorter than a discharge time of the third step, and
   a power of the discharge in the first step is set to be greater than a power of the arc discharge in the third step.

2. The fusion splicing method according to claim 1, further comprising:

a step of performing a sputter discharge for cleaning the end surfaces before the first step,
wherein a time from stopping the sputter discharge to starting the discharge in the first step is longer than 100 milliseconds.

3. The fusion splicing method according to claim 1, wherein a discharge time of the first step is 100 milliseconds or less.

\* \* \* \* \*